UNITED STATES PATENT OFFICE.

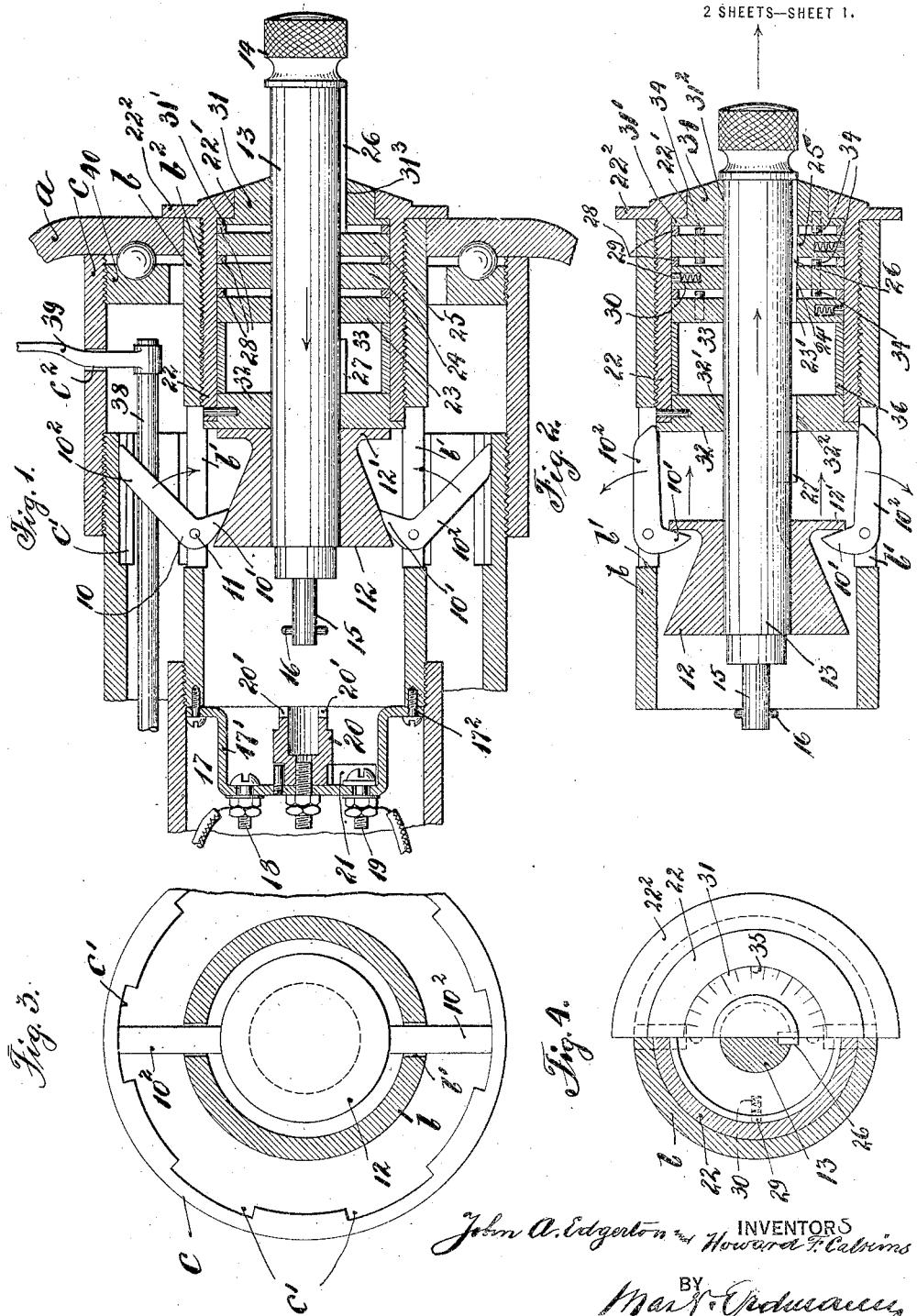

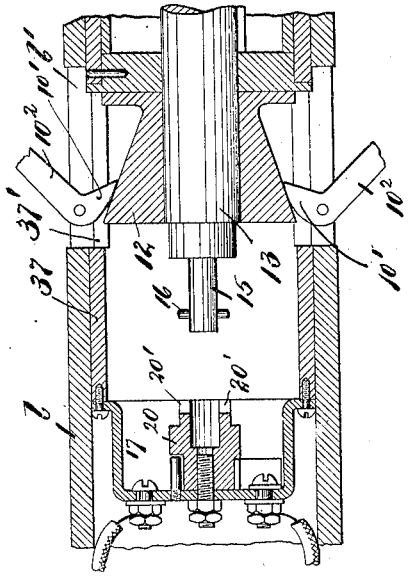

JOHN A. EDGERTON AND HOWARD F. CALKINS, OF NEWARK, NEW JERSEY.

KEYLESS LOCK FOR AUTOMOBILES.

1,378,335.  Specification of Letters Patent.  Patented May 17, 1921.

Application filed April 6, 1920. Serial No. 371,670.

*To all whom it may concern:*

Be it known that we, JOHN A. EDGERTON and HOWARD F. CALKINS, both citizens of the United States of America, residing at Newark, in the county of Essex and State of New Jersey, have invented certain new and useful Improvements in Keyless Locks for Automobiles, of which the following is a specification.

The present invention relates to locking means for automobiles or the like, and has for its principal object to provide a lock whereby the steering mechanism may be locked in inoperative position.

Another object of this invention is to construct the device as a keyless lock and a still further object is to so construct the same that the steering mechanism and the means for operating the magneto and battery controlling switch may be locked in one operation.

A still further object is to arrange the battery and magneto controlling switch in the casing of the steering post and to provide means whereby the cutting off of the switch will be effected simultaneously with the locking of the steering wheel.

With these and other objects in view, our invention substantially consists in a locking device adapted to be interposed between the steering arm and its casing and to be operated by means of a longitudinally slidable combination lock controlled plunger, the inner end of which serves to operate the magneto and battery controlling switch as will be hereinafter more fully described and defined in the appended claims.

In the accompanying drawing in which similar reference characters denote corresponding parts, Figure 1 is a longitudinal section of the steering control mechanism, the magneto and battery controlling switch and our novel locking mechanism in locked position; Fig. 2 is a similar section with some parts omitted showing the locking mechanism in unlocked position; Fig. 3 is a cross section of the device shown in Fig. 1; Fig. 4 is partly a cross section of Fig. 2; Fig. 5 is a perspective view of a front part of an automobile, showing the steering mechanism and the electric connections leading from the switch; Fig. 6 is a rear view of the switch; Fig. 7 is a front view thereof and Fig. 8 a section similar to Fig. 2 of a slightly modified construction of the locking mechanism.

Referring to the drawing more specifically, $a$ denotes the steering wheel of an automobile, $b$ the tubular steering post carrying the steering wheel and $c$ the steering post casing.

Our novel device consists of a locking mechanism adapted to be interposed between the steering post $b$ and its casing $c$ to be operated from the center of the steering wheel so as to effect an engagement between the steering post and casing whereby the steering wheel will be locked against turning.

The locking device comprises locking members 10, 10, two or more in number, made in form of bell crank levers pivoted to the tubing or post $b$, so as to swing vertically. To this end the tubing or post $b$ is recessed longitudinally as at $b'$ and the locking members are fulcrumed on pins 11 extending transversely through the recesses and fixed in the tubing. Through these recesses the members 10 project each with one arm $10'$ inwardly while the other arm $10^2$ thereof in normal position extends along the recess $b'$, as in Fig. 2, but in locking position is adapted to project toward the casing $c$ and to engage a notch or groove $c'$ arranged opposite said arm as in Fig. 1. These locking members are adapted to be operated by means of a longitudinally movable cam 12 arranged centrally in said tubing $b$ and made in form of a conical body formed at its inner reduced end with a cylindrical flange or shoulder $12'$ which in normal position is adapted to occupy the position shown in Fig. 2, that is to say, to lie with its inner face close to the inner faces of the arms $10'$ of the locking members 10. The outer faces of said arms $10'$ are rounded and are adapted on the longitudinal displacement of the cam 12 to engage the conical surface of the latter and to be thereby positively swung, whereby the outer arms $10^2$ of the locking members will be caused to swing outwardly from the recesses $b'$ and to engage the opposite notches or grooves $c'$ of the casing $c$ locking the post or tubing $b$ of the steering wheel $a$ against turning.

In order that the steering wheel may be locked in any position and to thereby obviate the necessity of first turning it to normal before locking, a circular row of notches $c'$ may be provided on the inner circumference of the casing $c$ and arranged in as close proximity to one another as possible. The notches $c'$ may be made somewhat wider than the thickness of the arms $10^2$, whereby the positioning of the steering wheel in locking position will be facilitated.

The cam 12 is mounted on and centrally fixed to a longitudinally slidable and rotary plunger or rod 13 which extends centrally through the tubing $b$ and of which the outer end projects outwardly from the tube $b$ and carries a knob 14 for its manipulation. The inner end 15 of said plunger is reduced in diameter and provided with a cross pin 16 or the like to serve as a catch. 17 denotes the magneto and battery controlling switch which usually is arranged in front of the driver's seat and operated by separate key controlled buttons or the like. The switch as usually constructed consists of a dish shaped casing $17'$ carrying in its bottom terminals 18, 19 for the battery and magneto and a rotary hollow and notched plug 20 carrying a contact member 21. According to our invention the casing $17'$ of the switch is suitably fixed to the tube $b$ as at $17^2$ so that its plug projects toward and is capable of receiving the reduced end 15 of the plunger 13, while its lateral notches $20'$ are adapted to engage the projecting ends of the cross pin 16 fixed to said plunger. On the longitudinal outward movement into locking position of the plunger, the rear or inner end 15 of the latter will be withdrawn from the plug 20 so that the switch will be cut out.

To secure the locking members 10 in their locking position, we provide a combination lock which may be of any suitable construction and which may be arranged in a cylindrical casing 22 in which the plunger is movably guided. The casing 22 is adapted to be fixed to the tubular post $b$ of the steering wheel. In the present embodiment of our invention, the tube $b$ is internally threaded as at $b^2$ and the casing 22 is provided with corresponding external thread to work therein. The outer wall of said casing is centrally perforated as at $22'$ and provided with an annular flange $22^2$ which is adapted to bear against the outer hub portion of the steering wheel and conceal the tube $b$.

The combination lock proper in the present embodiment of our invention consists of a plurality of centrally perforated disks, 23, 24, 25 mounted around the plunger 13 one behind the other and fitting in said casing. The plunger is formed on its circumference with longitudinally projecting tongues 26, 27 arranged in extension of one another. The disks 23, 24, 25 are each provided with a notch $23'$, $24'$, $25'$ extending from the central perforation thereof and adapted to engage the tongues 26, 27 when brought in alinement therewith. The disks are suitably spaced apart, as by rings 28 or the like and may be held in frictional engagement with the inner surface of the casing by spring actuated pins 29 provided in radial grooves 30 of the disks. Extending through the central opening $22'$ of the outer wall of the casing 22 is a guide member 31 which at its rear end is formed with an annular flange $31'$ adapted to rotatively bear against the inner face of said wall. This guide member 31 is provided with a central hole $31^2$ and a groove or notch $31^3$ to slidably bear the plunger 10. Suitably fixed to the rear end of the casing 22 is a second guide 32 having a central bore $32'$ and a groove or notch $32^2$ to slidably bear the plunger 10. The notch $32^2$ serves as a passage for the shorter tongue 27 when the plunger 13 is moved longitudinally into or out of the locking position. The object of the short tongue 27 is to prevent the locking of the plunger before the switch is turned to neutral, i. e., with both, battery and magneto circuits broken, and to also facilitate the engagement of the catch 16 with the notches $20'$ of the plug 20 on unlocking the device. The space 33 between the rear disk 23 and guide 32 and the tongue 27 and groove $32^2$ are so admeasured that when the plunger is in locking or unlocking position (Figs. 1 and 2) the tongue 27 will be released from the groove $32^2$ and occupy a position either within the space 33 or behind the rear guide 32. Before the plunger 10 can be moved into locking position and removed from the locking disks 23, 24, 25, it must be turned on its axis to bring the tongue 27 in alinement with the groove $32^2$. The position of the groove $32^2$ corresponds to the neutral position of the switch plug 20.

Projecting laterally from each locking disk toward the adjoining disk and from the front guide 31 toward the adjacent locking disk is a pin or catch 34. These pins have the function to transmit motion in well known manner from one disk to the adjoining one and from the guide to the locking disks when the pins projecting from opposite faces thereof meet.

As usual there is a scale 35 around the circumference of the outer face of the rotary guide 31, and a zero mark (not shown) on the adjoining circular edge of the stationary outer wall of the casing 22 for working the combination.

36 denotes a spacer between the rear locking disk 23 and the guide 32.

In the modification shown in Fig. 8 the combination lock casing 37 is extended rearwardly and is provided with recesses 37' conforming and coinciding with the recesses b' in the tube b to permit the levers 10² to swing through said recesses. The switch 17 is fixed to the rear end of the extended casing 37.

While with the form of construction shown in Figs. 1 and 2 the tubing b may have to be made in two sections, as shown, in order to enable the fixing of the switch 17 thereto, the modification of Fig. 8 does not require such sectional construction of the tubing. Moreover, the switch and the locking mechanism form a unit and can be easily removed for purposes of repair or the like.

38 denotes the spark controlling rod which according to the present embodiment extends between the casing c and steering post b and carries the handle 39 projecting through a recess c² of said casing. 40 denotes a ball bearing which may be advantageously used for the steering wheel a.

The operation of our locking device is as follows:

In normal position the plunger 13 extends inwardly as in Fig. 2 with the cam 12 so positioned relative to the locking levers 10, that the inner arms 10' thereof clear the conical surface of the cam and rest with their forward surfaces against the rear surface of the flange 12', while the outer arms 10² of the arm extend horizontally within the grooves b'. At the same time the rear end 15 of the plunger 13 engages with its catch 16 the plug 20 of the switch. In this unlocked position the plunger 13 can be turned on its longitudinal axis together with the guide disk 31 to operate the switch plug 20 without affecting the locking arms 10.

To lock the steering wheel and simultaneously cut out the switch, the plunger is first turned on its axis until the tongue 27 coincides with the groove 32² and is then moved outwardly to disengage the tongue 26 from the grooves 23', 24', 25' of the locking members 23, 24, 25, simultaneously removing its end 15 from the switch and causing the cam 12 to throw the locking members 10 into engagement with the grooves c' of the casing c. On then turning the plunger 13 the tongues 26, 27 become displaced relative to the groove 32² of the guide 32 and the groove 25' in the locking disk 25 and the pin 34 projecting from the rear of the guide disk 31 will cause the displacement of the locking members relative to one another. As a result thereof the plunger will become locked in its outwardly projecting position and the members 10 will be locked in engagement with the casing c (Fig. 1).

We are aware that the device can be modified in various ways by those skilled in the art without departing from the spirit of our invention and we, therefore, do not wish to limit ourselves to the particular construction shown and described.

What we claim and desire to secure by Letters Patent is:

1. In an automobile, the combination with the tubular steering wheel post and electric switch thereof, of a plunger borne in said post and capable of longitudinal and turning movements, means on said plunger for operatively and removably engaging said switch, locking members for locking said post in inoperative position, means on said plunger to operate said members during its longitudinal displacement and keyless means for locking said plunger in its locking position.

2. In an automobile, the combination with the steering wheel, of a tubular post carrying said wheel, a casing for said arm, a battery and magneto controlling switch arranged in said casing, a plunger slidably and rotatively mounted in said arm and capable of operatively engaging said switch, locking means between said post and said casing adapted to be operated by the longitudinal displacement of said plunger to lock the steering wheel and a combination lock for said plunger.

3. In a vehicle, the combination with the steering wheel post, of a plunger slidably and rotatively borne in said post, locking means for locking said post, means on said plunger which by the longitudinal displacement of the latter, will operate said locking means and combination locking means controlled from said plunger for locking the latter against longitudinal displacement.

4. In a vehicle, the combination with the steering wheel post, of a plunger slidably and rotatively borne in said post, locking means for locking said post, a cam carried by said plunger to operate said locking means during its longitudinal displacement and combination locking means controlled from said plunger for locking the latter against longitudinal displacement.

5. In a vehicle, the combination with the steering wheel post and casing therefor, of a plunger slidably and rotatively borne in said post, locking members capable of engaging said casing to lock said post, means on said plunger to operate said members during the longitudinal displacement of said plunger and combination locking means controlled from said plunger by rotating the latter and serving to lock said plunger against longitudinal movement.

6. In a motor vehicle, the combination with the steering wheel post, of an electric switch in extension of said post, a plunger slidably and rotatively borne in said post and capable in its extreme inner position to actuate said switch and locking means for locking said post operated by the longitudinal displacement of said plunger.

7. In a motor vehicle, the combination with the steering wheel post, of a plunger slidably and rotatively mounted therein, locking means between said casing and said post for locking the latter and operated by said plunger during its longitudinal displacement, and a combination lock for locking said plunger against longitudinal displacement, said lock including a plurality of rotary disks mounted in said post around said plunger and means on said plunger adapted to coöperate with said disks.

In testimony whereof we affix our signatures in presence of two witnesses.

JOHN A. EDGERTON.
HOWARD F. CALKINS.

Witnesses:
 MAX D. ORDMANN,
 JOSEPH T. MCMAHON.